US012274676B1

(12) United States Patent
Zaker et al.

(10) Patent No.: US 12,274,676 B1
(45) Date of Patent: Apr. 15, 2025

(54) AUTOMATED MEDICATION DISPENSING

(71) Applicant: CareNovate Inc., Aliso Viejo, CA (US)

(72) Inventors: Amir Zaker, Tustin, CA (US); Shahram Mokhtarzadeh, Los Angeles, CA (US); Kathy J. Maghbouleh, Santa Ana, CA (US)

(73) Assignee: CareNovate Inc., Aliso Viejo, CA (US)

(*) Notice: Subject to any disclaimer, the term of this patent is extended or adjusted under 35 U.S.C. 154(b) by 0 days.

(21) Appl. No.: 18/920,928

(22) Filed: Oct. 20, 2024

Related U.S. Application Data

(60) Provisional application No. 63/678,450, filed on Aug. 1, 2024.

(51) Int. Cl.
*A61J 7/04* (2006.01)
*A61J 7/00* (2006.01)

(52) U.S. Cl.
CPC ........... *A61J 7/0436* (2015.05); *A61J 7/0069* (2013.01); *A61J 7/0418* (2015.05)

(58) Field of Classification Search
CPC ....... A61J 7/0436; A61J 7/0069; A61J 7/0418
See application file for complete search history.

(56) References Cited

U.S. PATENT DOCUMENTS 4,617,557 A 10/1986 Gordon
4,693,371 A 9/1987 Malpass
5,351,818 A 10/1994 Daneshvar
5,710,551 A 1/1998 Ridgeway
5,827,180 A 10/1998 Goodman
6,771,174 B2 8/2004 Broas
7,145,552 B2 12/2006 Hollingsworth
7,928,835 B1 4/2011 Jovanov et al.
8,060,249 B2 11/2011 Bear et al.
8,108,068 B1 * 1/2012 Boucher ................ G01G 17/00 700/240
8,193,918 B1 6/2012 Shavelsky et al.
8,744,620 B2 6/2014 Shavelsky et al.
8,754,769 B2 6/2014 Stein et al.
8,762,166 B2 6/2014 Inciardi et al.
8,884,752 B2 11/2014 Tai et al.
9,387,154 B2 7/2016 Aggarwal et al.
9,597,261 B2 3/2017 Baarman et al.
9,770,390 B2 9/2017 Aggarwal et al.
10,460,734 B2 10/2019 Jones et al.
10,722,429 B2 * 7/2020 Shibasaki ............... B01F 23/40
10,940,092 B2 * 3/2021 Song ........................ G07F 11/44
11,116,697 B1 * 9/2021 Williams .............. A61J 1/1418
11,246,805 B2 * 2/2022 Chen ........................ B65B 5/103
11,554,081 B1 * 1/2023 Gellman ................ G16H 10/65
11,752,071 B2 * 9/2023 Song ...................... G16H 20/13 221/2

(Continued)

*Primary Examiner* — Michael Collins
(74) *Attorney, Agent, or Firm* — Clause Eight; Michael Catania

(57) ABSTRACT

A system and apparatus for automated medication dispensing are disclosed herein. The system includes a management platform residing on a server and an apparatus in communication with the management platform. The apparatus includes a body, a user interface screen on the body, a processor, a memory, a motor driven rotation carousel plate, universal caps, funnels, a vacuum extraction mechanism, a magnetic resonance agitator, a verification station, a scale-equipped platform, and a dispensing cup.

13 Claims, 11 Drawing Sheets

(56) References Cited

U.S. PATENT DOCUMENTS

| | | | | |
|---|---|---|---|---|
| 11,857,505 | B2 * | 1/2024 | Long | A61J 7/0076 |
| 2007/0097792 | A1 | 5/2007 | Burrows et al. | |
| 2007/0260491 | A1 | 11/2007 | Palmer et al. | |
| 2008/0047969 | A1 | 2/2008 | Farham et al. | |
| 2010/0100391 | A1 | 4/2010 | Daya et al. | |
| 2010/0283601 | A1 | 11/2010 | Tai et al. | |
| 2010/0305967 | A1 | 12/2010 | Daya et al. | |
| 2010/0314282 | A1 | 12/2010 | Bowers | |
| 2011/0166700 | A1 | 7/2011 | Dunn | |
| 2012/0029693 | A1 | 2/2012 | Bear et al. | |
| 2012/0101630 | A1 | 4/2012 | Daya et al. | |
| 2012/0191476 | A1 | 7/2012 | Reid et al. | |
| 2012/0206500 | A1 | 8/2012 | Koprowski | |
| 2013/0002795 | A1 | 1/2013 | Shavelsky et al. | |
| 2013/0106684 | A1 | 5/2013 | Weast et al. | |
| 2013/0193030 | A1 | 8/2013 | Kroupa | |
| 2013/0195326 | A1 | 8/2013 | Bear et al. | |
| 2013/0222135 | A1 | 8/2013 | Stein et al. | |
| 2014/0046147 | A1 | 2/2014 | Hafezi et al. | |
| 2014/0052468 | A1 | 2/2014 | Burrows et al. | |
| 2014/0166529 | A1 | 6/2014 | Fung et al. | |
| 2014/0188272 | A1 | 7/2014 | Bear et al. | |
| 2017/0231870 | A1 * | 8/2017 | Stachler | A61J 7/0084<br>222/28 |
| 2018/0161241 | A9 | 6/2018 | Soliman | |
| 2018/0303719 | A1 | 11/2018 | DeLury | |
| 2018/0336318 | A1 | 11/2018 | Bhatt et al. | |
| 2019/0107501 | A1 | 4/2019 | Mehregany | |
| 2019/0189307 | A1 * | 6/2019 | Mehrotra | H01B 13/01236 |
| 2019/0318283 | A1 | 10/2019 | Kelly et al. | |
| 2019/0374436 | A1 * | 12/2019 | Townley | G16H 40/63 |
| 2023/0147994 | A1 * | 5/2023 | Mercolino | G16H 40/63<br>700/240 |

* cited by examiner

AUTOMATED MEDICATION DISPENSING

CROSS REFERENCE TO RELATED APPLICATION

The Present Application claims priority to U.S. Provisional Patent Application Number 63/678450, filed on Aug. 1, 2024.

STATEMENT REGARDING FEDERALLY SPONSORED RESEARCH OR DEVELOPMENT

Not Applicable

BACKGROUND OF THE INVENTION

Field of the Invention

The present invention generally relates to medication dispensing.

Description of the Related Art

Administering medication within healthcare settings is pivotal yet fraught with complexity, requiring unerring precision, promptness, and tailoring to individual patient requirements. Conventional methodologies, heavily dependent on manual sorting, recording, and distribution of pharmaceuticals, are inherently prone to errors and inefficiencies that can negatively impact patient care and disrupt medical workflows. The emergence of automated systems for dispensing medication represented a leap forward, harnessing technological innovations to bolster precision, safety, and efficiency. Nonetheless, many such systems are limited by their lack of scalability, adaptability, and full integration with the wider medical infrastructure, including electronic health records, healthcare personnel coordination, and patient monitoring from afar.

There have been many attempts to improve medication adherence. For example, GlowCaps® from Vitality, Inc., Los Angeles, California is a cap that screws-on to most standard, prescription medicine bottles. When a medication becomes due, both the cap and a plug-in nightlight flash orange to alert the patient of their dose. The cap transmits data to the plug-in device which ultimately communicates data over a cellular network. Patients receive a series of reminders after their medication is due, culminating in a reminder phone call to the patient or caregiver if the pill bottle is not opened. In addition to monitoring compliance, the GlowCaps® cap can also send a request for a new prescription via a push button that lies under the cap. Patients receive a call shortly after pushing the button, confirming their prescription.

MedPod, from Daya Medicals, Inc., Miami, Florida ("DayaMed"), is a rechargeable and portable dispenser of pre-sorted medication. The MedPod reminds patients and/or their caregivers of missed doses via text, email, or by phone. LED lighting and audible reminders alert patients that they need to take their dose. DayaMed produces self-contained cartridges that can be loaded directly into the Medpod. These cartridges are shipped directly to patients, eliminating the need to manually load the device. Medpod is also equipped with a calling functionality that allows patients to directly contact their pharmacist or provider.

U.S. Pat. Nos. 8,744,620, 8,193,918, and U.S. Patent Publication Number 2013/0002795, assigned to MedMinder Systems, Inc., describe a technology enabled pill box that separates a patient's medications into 4 compartments for each day of the week. The compartments contain cups which in turn contain pills. Manipulating a lid, and/or placing into, removing from, or replacing a cup in a correct compartment are detected and compared to a medication dispensing compliance schedule. If a lid is not opened or a cup is not removed within a designated time frame, the patient receives an auditory prompt in addition to subsequent phone calls, text messages, and emails. The pill box can be equipped with wireless pendant that serves as a medical alert that connects patients to a medical professional at a certified monitoring center. MedMinder sells two basic types of pill boxes, one whose compartments remain locked until a dose is due and another whose compartments remain unlocked. Additionally, a patient can opt for MedMinder to issue trays, which can be filled by a caretaker to ease the burden of loading the pill box. The compartments of this tray contain the pill cups that the box would otherwise use.

U.S. Pat. No. 8,754,769, U.S. Patent Publication Number 2014/0347175, U.S. Patent Publication Number 2014/024094, and U.S. Patent Publication Number 2013/0222135, assigned to AdhereTech, Inc., describe smart pill bottles that track the exact amount of medication inside the bottle in real-time, wirelessly sends the data into the cloud, and reminds patients to take their dose via automated call or text message. In addition, the pill bottle is equipped with LED lighting to alert patients directly that a medication dose is due.

Other prior art solutions include Hero, Pillo, MED-Q, Forgetting the pill, Vaica, Livi Pill Dispenser, Timer Cap medicine bottle, MEDCENTER, GMS Group Medical Supply, LLC, lifeline philips, and Pillrite, information on each is available at their respective website.

BRIEF SUMMARY OF THE INVENTION

In response to this need, the present invention is an advanced medical apparatus that transforms the management and delivery of medications. This system fuses an AI-augmented automated dispensing apparatus with robotic arms, precise sensors, and actuators to dispense a variety of medications concurrently and accurately. The present invention's inventory management is dynamic and IoT-driven, closely monitoring stocks in real-time to maintain optimal levels and reduce wastage due to expirations. Coupled with an intelligent task scheduling platform powered by AI, the present invention enhances the efficiency of medical services, fortified by a blockchain-based network that secures HIPAA-compliant information exchange. Further enriched with responsive, multi-platform interfaces, in-depth data analytics, and adaptable data visualization options, the present invention delivers a rich, intuitive overview of healthcare operations and patient care results. Its predictive analytics proactively forecast regulatory and health concerns, and its telehealth integrations facilitate direct, timely health consultations, seamlessly incorporating remote evaluations into patient care strategies. Reinforced by instantaneous feedback mechanisms and machine learning, the present invention exemplifies a progressive blend of technological innovation and healthcare, dedicated to elevating the standard of medication management and improving the spectrum of care services.

One aspect of the present invention is an apparatus for automated medication dispensing. The apparatus comprises a body, a user interface screen on the body, a processor, a memory, a motor driven rotation carousel plate, universal caps, funnels, a vacuum extraction mechanism, a magnetic resonance agitator, a verification station, a scale-equipped platform, and a dispensing cup. The processor is positioned within the body and in communication with the user interface screen. The memory is positioned within the body and in communication with the processor. The memory comprises a pre-programmed database. The motor driven rotating carousel plate is positioned within the body and configured to hold medication bottles. Each of the medication bottles has a universal cap. Each of the universal caps is connected to a funnel. The vacuum extraction mechanism comprises a vacuum pump and a retractable nozzle. The vacuum extraction mechanism is in flow communication with each of the funnels. The magnetic resonance agitator comprises a magnetic field generator. The magnetic resonance agitator is in flow communication with each of the funnels. The verification station comprises a counter and high resolution cameras. The verification station is in flow communication with the magnetic resonance agitator. The dispensing cup is positioned on the scale-equipped platform. The dispensing cup is in flow communication with the verification station. The vacuum extraction mechanism generates a negative pressure to draw selected pills from a medication bottle of the medication bottles via a universal cap and through a connected funnel of the funnels to the magnetic resonance agitator. The magnetic resonance agitator is configured to generate a pre-determined vibration to induce a resonant frequency that matches the natural frequency of the material of the selected pills to ensure separation of the selected pills. The verification station is configured to verify the accuracy of each pill dispensed by comparing at least one characteristic of the selected pills against a data for the selected pills in the pre-programmed database, and the verification station is configured to count the selected pills. The scale-equipped platform is configured to verify the weight of the dispensing cup containing the selected pills.

Another aspect of the present invention is a system for automated medication dispensing. The system comprises a management platform residing on a server and an apparatus in communication with the management platform. The management platform is configured to predict medication usage patterns and optimize stock levels. The apparatus comprises a body, a user interface screen on the body, a processor, a memory, a motor driven rotation carousel plate, universal caps, funnels, a vacuum extraction mechanism, a magnetic resonance agitator, a verification station, a scale-equipped platform, and a dispensing cup. The processor is positioned within the body and in communication with the user interface screen. The memory is positioned within the body and in communication with the processor. The memory comprises a pre-programmed database. The motor driven rotating carousel plate is positioned within the body and configured to hold medication bottles. Each of the medication bottles has a universal cap. Each of the universal caps is connected to a funnel. The vacuum extraction mechanism comprises a vacuum pump and a retractable nozzle. The vacuum extraction mechanism is in flow communication with each of the funnels. The magnetic resonance agitator comprises a magnetic field generator. The magnetic resonance agitator is in flow communication with each of the funnels. The verification station comprises a counter and high resolution cameras. The verification station is in flow communication with the magnetic resonance agitator. The dispensing cup is positioned on the scale-equipped platform. The dispensing cup is in flow communication with the verification station. The vacuum extraction mechanism generates a negative pressure to draw selected pills from a medication bottle of the medication bottles via a universal cap and through a connected funnel of the funnels to the magnetic resonance agitator. The magnetic resonance agitator is configured to generate a pre-determined vibration to induce a resonant frequency that matches the natural frequency of the material of the selected pills to ensure separation of the selected pills. The verification station is configured to verify the accuracy of each pill dispensed by comparing at least one characteristic of the selected pills against a data for the selected pills in the pre-programmed database, and the verification station is configured to count the selected pills. The scale-equipped platform is configured to verify the weight of the dispensing cup containing the selected pills Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
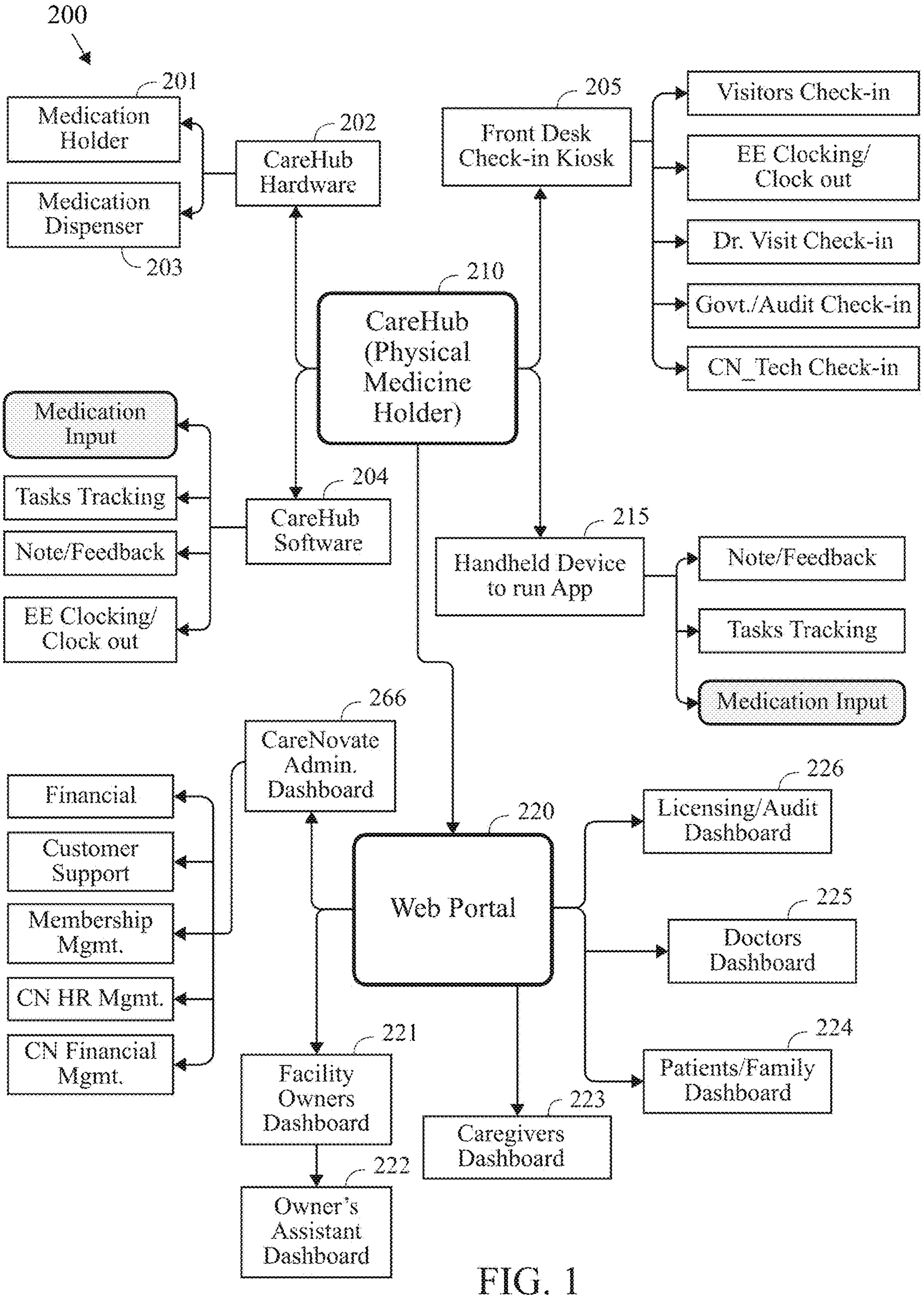
FIG. 1 is a flow chart of the system.

As shown in FIG. 1, the system 200 is an integration of AI and advanced technologies in healthcare, employing a microservices architecture for robust, scalable, and secure management of medical and operational data. A physical medicine holder 210 is comprised of hardware 202 and software 204, with the ability to communicate with applications on handhelds 215 and front desk/check-in kiosks 205. At the medicine holder 210, one can monitoring patients, manage tasks, and add medications. Patient monitoring includes medications, tasks, and appointments. On the web portal 220, the following can be done: station registration; HW registration; add employees (EE); add patients; add doctors; add family members; overviewing, which include facility, employee (caregivers) patients, documents and forms; reports and analytics.

The system 200 offers dashboards of differentiated access levels through a secure web portal 220 (and mobile applications 215), such as, the facility owner 221 would have full access, while the owner's assistant/s 222 would have access based on the permission by the owner. Thus, enabling personalized monitoring and interaction for caregivers 223, family members 224, healthcare providers 225, licensing/auditors 226, and administrative staff 227. This includes live updates, health data review, and direct communication channels, fostering a collaborative care environment. The caregiver dashboard 223 allows for updating their documents, and document update notifications. The patient/family can monitor the medications, monitor tasks, monitor appointments, do surveys, participate to adding medications, and review vitals through their dashboard 224. The doctors can monitor medications, add notes/feedback, make medication modifications, do surveys, review vitals, and review medical documents through their dashboard 225. A licensing/audit board can monitor medications, document the facility, monitor tasks, and do surveys through their dashboard 226.

The system 200 includes IoT-enabled automated medication holders 201 equipped with real-time sensing for meticulous inventory management. The AI-driven robotic dispensers 203 utilize precision sensors and actuators to ensure accurate and sanitary medication delivery. The system's software 204 framework employs reactive programming for a responsive cross-platform user experience, capable of running on both mobile and web applications. AI algorithms enhance task scheduling, adjusting in real time to patient needs and caregiver availability, while sentiment analysis of feedback helps identify improvement opportunities, bolstering the quality of patient care. For security and compliance, the system incorporates blockchain technology for HIPAA-compliant, immutable record-keeping and secure communications within the medical staff community. The telehealth modules, equipped with AI, facilitate remote patient monitoring and personalized care recommendations, ensuring continuous patient engagement. Deep learning algorithms analyze complex medical data, providing predictive analytics for patient health outcomes and facilitating informed decision-making. The real-time data dashboard, powered by business intelligence tools, presents healthcare metrics in an accessible, visual format, offering insights into operational performance and patient care quality. The automated reporting system efficiently generates essential documents for compliance and auditing, enhancing accuracy and reducing manual labor.

Figure 2:
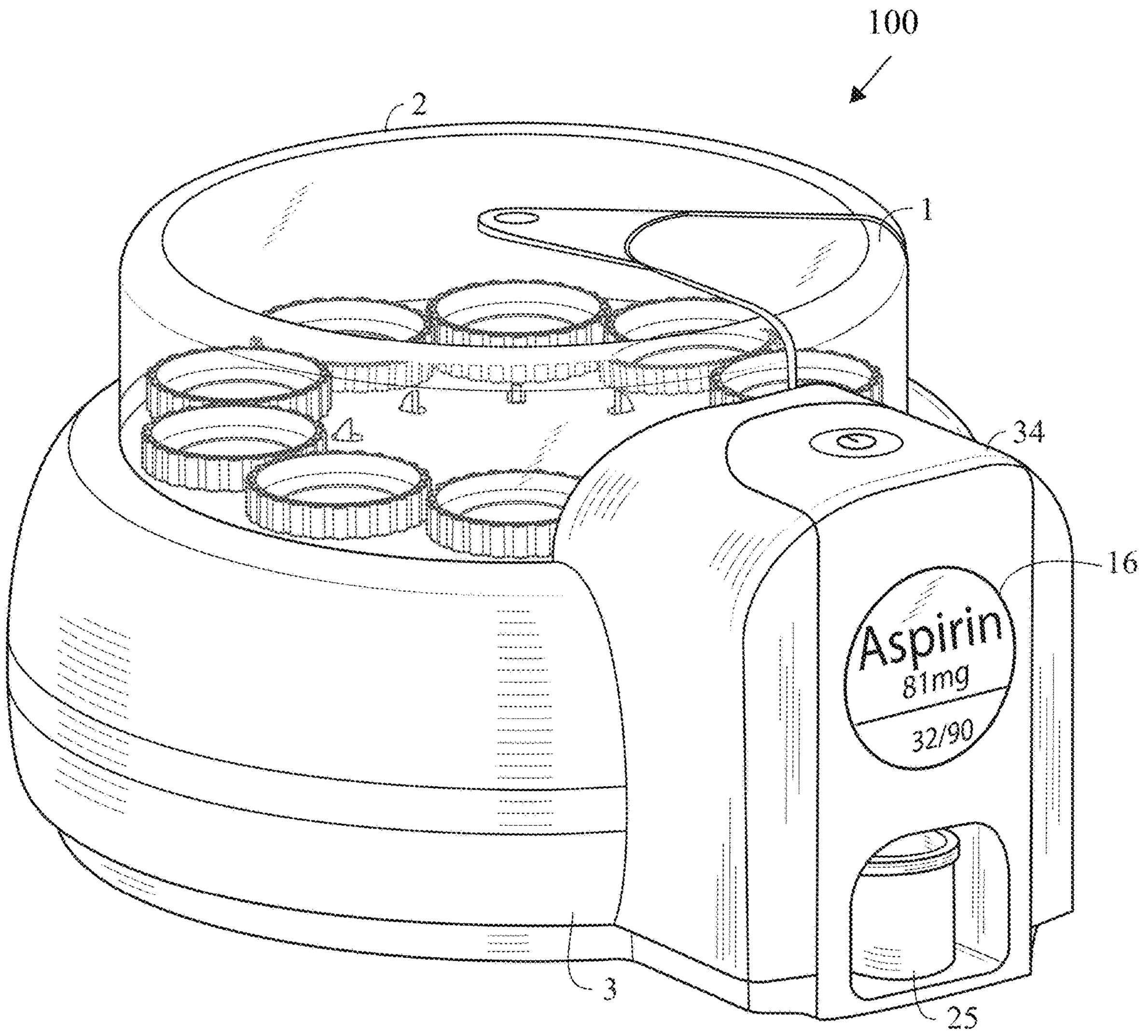
FIG. 2 is an illustration of the dispensing apparatus.

FIG. 2 is an illustration of the dispensing apparatus 100. The medicine dispensing apparatus 100 is a medical device designed to streamline and optimize healthcare delivery.

Figure 3A:
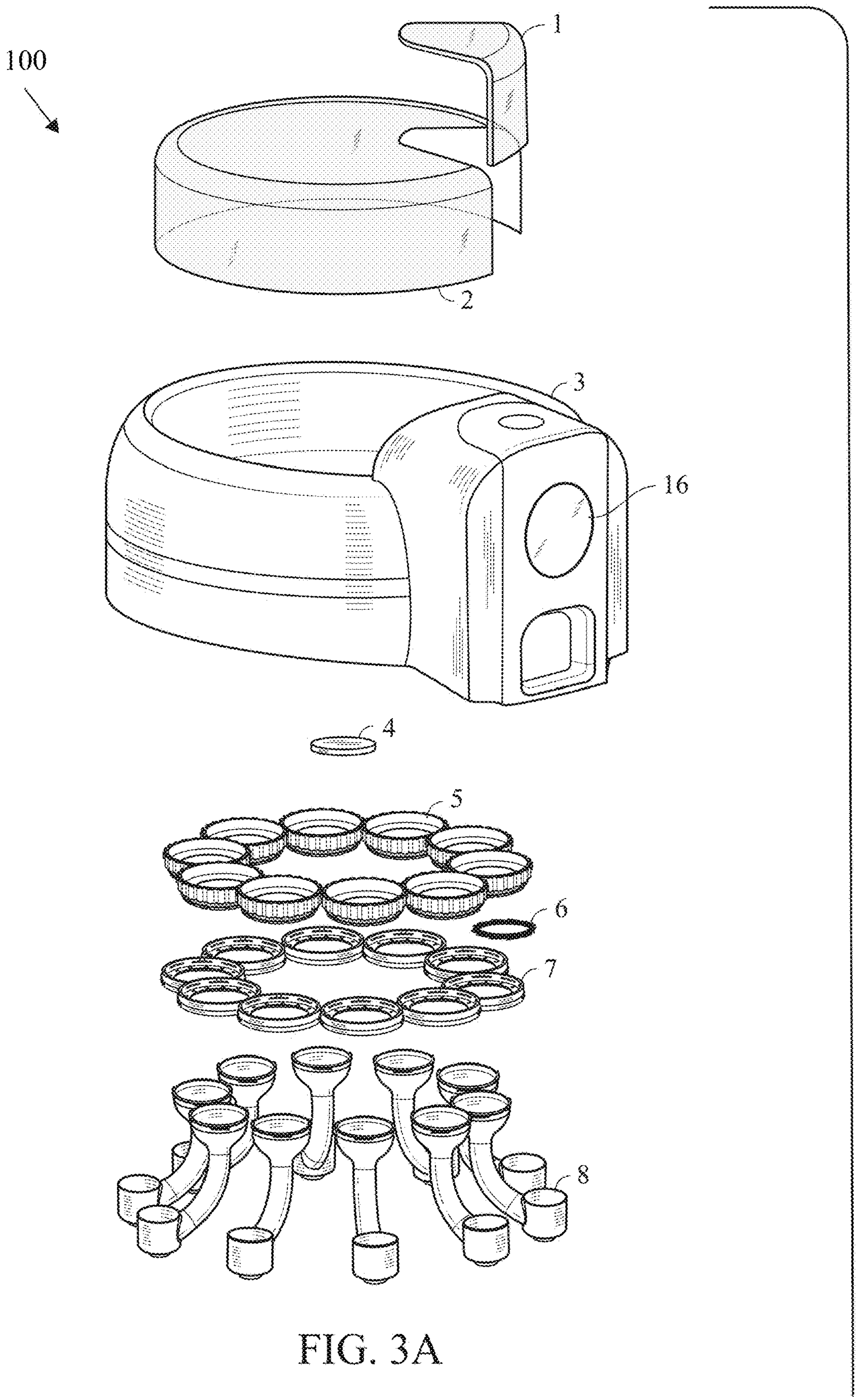
FIG. 3A is an exploded view of the apparatus.
Figure 3B:
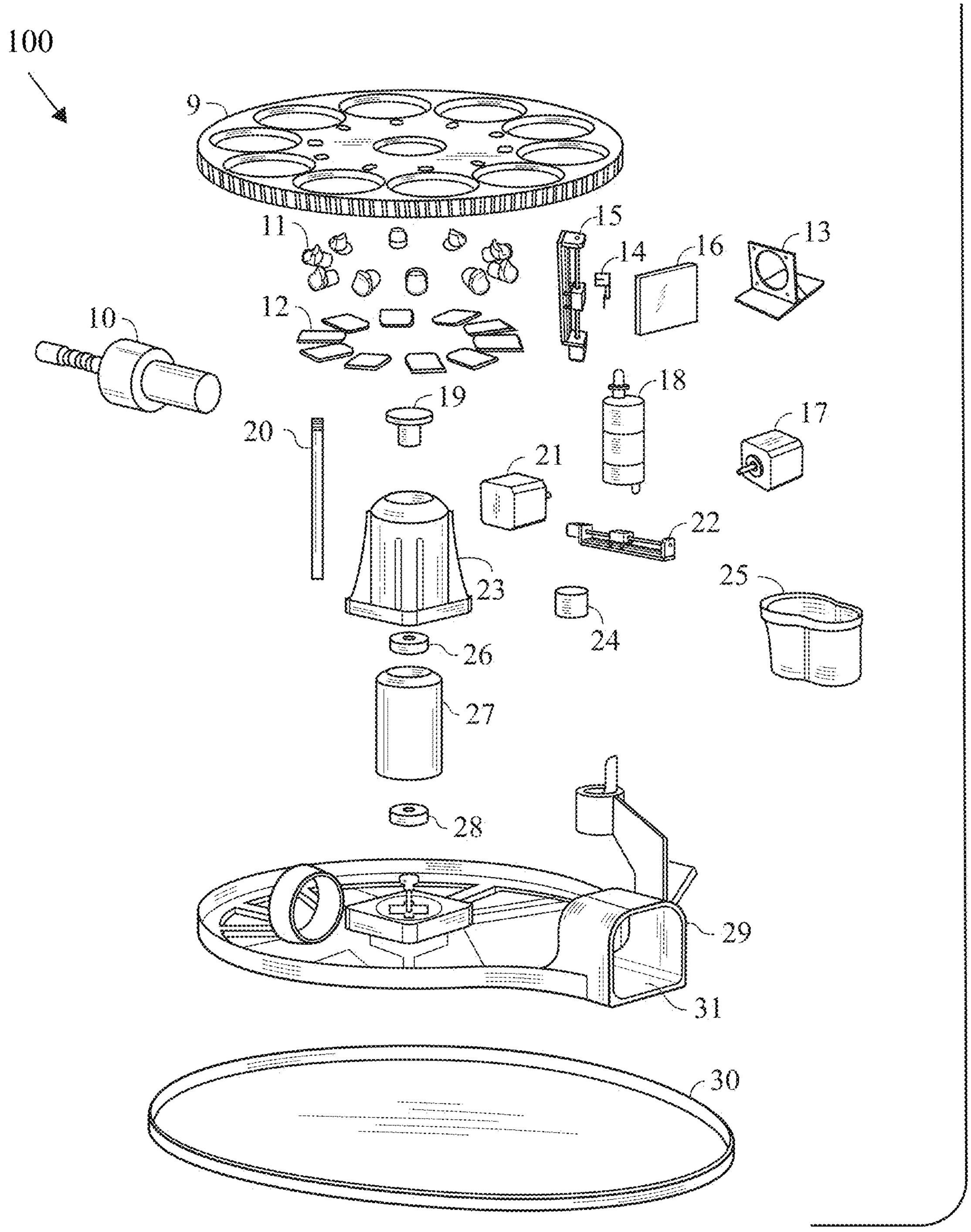
FIG. 3B is a continuation of the exploded view of the apparatus of FIG. 3A.

FIGS. 3A-3B are an exploded view of the apparatus 100. In a preferred embodiment, the apparatus has the following components. Cover Lead 1: A protective lead for the machine's cover, aiding in shielding sensitive electronics from interference or environmental factors. Cover 2: The outer casing that encloses the machine, providing protection and user interface real estate. Body 3: The main structural framework that houses all internal components of the machine. Lead 4: Electrical leads or a part that leads or guides other parts in their motion or function. Diaphragm Stiffener 5: A part designed to reinforce a diaphragm within the machine, likely contributing to the regulation of air or fluid flow. Diaphragm 6: This may control or modulate the flow of materials within the machine, such as in a pump mechanism. Diaphragm Main 7: The primary diaphragm component, is essential for the dispensing mechanism's proper functioning. Channel 8: A pathway designed to direct the flow of objects or substances within the machine. Sorter 9: A mechanism used to organize medications into the correct order or compartment. Air Pomp [Pump]10: An air pump would be responsible for moving air or creating a vacuum, potentially as part of a pneumatic dispensing system. Key 11: Typically, a part that engages with another to transmit torque or to align parts correctly. Key Support 12: The structure that supports or houses the key, ensuring its correct function and alignment. Motor1 Structure 13: The frame or housing for a motor, a part of the driving mechanism for the sorter or other moving parts. Optocounter 14: An optical sensor used to count dispensed medications or machine cycles. Vertical Rail 15: A guide rail that allows parts or assemblies to move vertically, part of the dispensing mechanism. LCD 16: A display screen for the user interface showing status, alerts, or input prompts. Motor 1 17: The main motor, driving the dispensing mechanism or the conveyance system. Sorter Motor 18: A dedicated motor for the sorting mechanism, allowing for precision and control in the sorting process. Headstock 19: A fixed structure on the machine that houses bearings or rotational parts. Shaft 20: A rotating element that transmits mechanical power within the machine. Motor 2 21: An additional motor, for secondary operations or to provide redundancy. Horizontal Rail 22: Similar to the vertical rail, but allowing for horizontal movement, in the sorting or dispensing system. Headstock Base 23: The base that supports the headstock, ensuring stability and alignment of moving parts. Vibrator 24: A component used to ensure the flow of medication or to settle contents within a compartment. Cup 25: A receptacle or holder that may contain medication before it's dispensed. Bearing 26, 28: A mechanical component that constrains relative motion and reduces friction between moving parts. Bearing Support 27: The structure that houses and supports bearings, maintaining the alignment and efficiency of the rotational parts. Main Structure 29: The primary framework of the machine, providing the foundational support for all components. Main Structure Support 30: Additional support for reinforcing the main structure, ensuring rigidity and stability.

Figure 4:
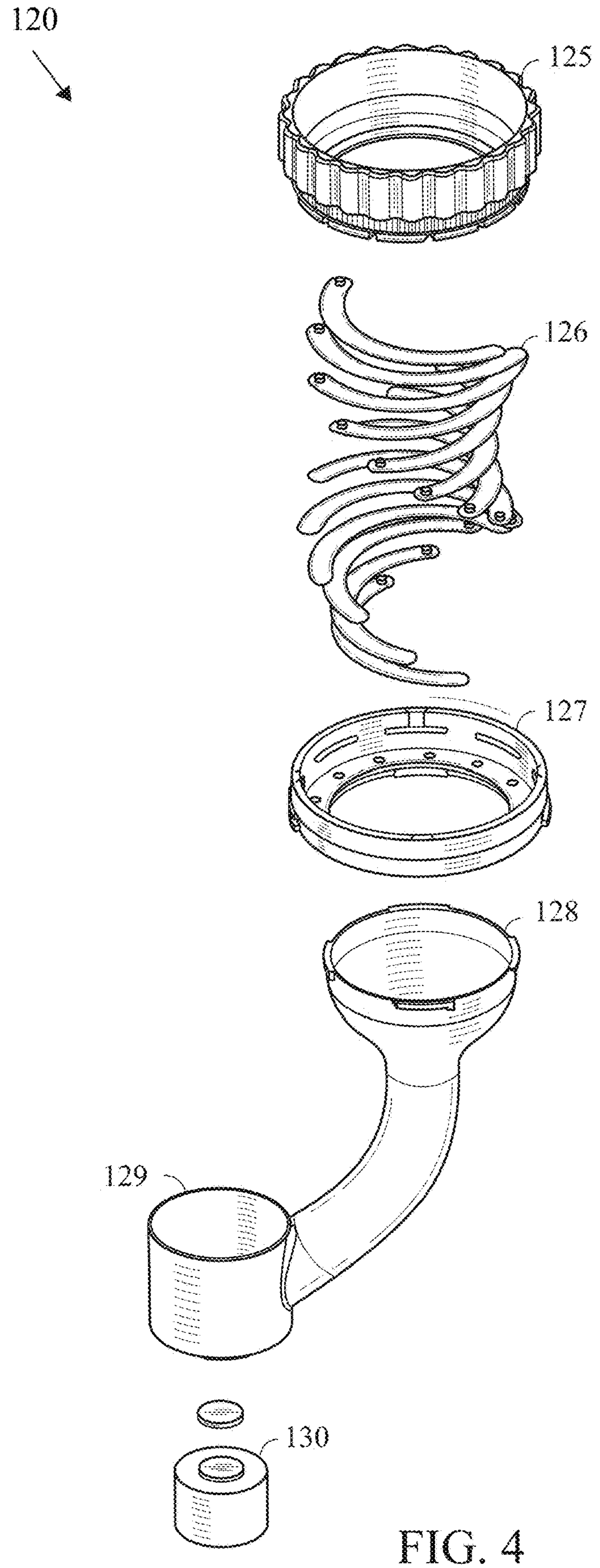
FIG. 4 is an exploded view of the universal cap.

FIG. 4 is an exploded view of a universal cap 120. The Smart Universal Cap (SUC) 120 comprises of a SUC adjuster 125, opening/closing vanes 126, fixer cap on machine 127, passage pipe 128, a pill holder 129, and a magnet 130. Addressing the challenges associated with traditional pill bottle caps, the SUC offers a seamless solution that adapts to various bottle sizes and shapes, simplifying the medication administration process. Inspired by the mechanism of a camera lens aperture, the SUC features a dynamic opening that expands or contracts to securely fit onto pill bottle openings. This unique design incorporates both manual and motorized operation modes, providing users with flexibility and convenience. Underpinning the functionality and reliability of the SUC is a comprehensive mechanical engineering analysis. Structural integrity assessments ensure the device can withstand repeated opening and closing cycles, while careful material selection, such as engineering thermoplastics like ABS or PC, guarantees durability and longevity. Precision-engineered components and control algorithms drive the motorized operation mode with accuracy, delivering a seamless user experience. Efficient manufacturing processes, notably injection molding, enable mass production of the SUC components, ensuring scalability and cost-effectiveness. Beyond medication management, the versatility of the SUC extends to various applications. For instance, it can be adapted to connect to hoses for gardening purposes, providing a convenient solution for watering plants with different nozzle sizes. In firefighting scenarios, the SUC can securely seal hoses, facilitating quick and reliable connections during emergency situations.

Figure 5:
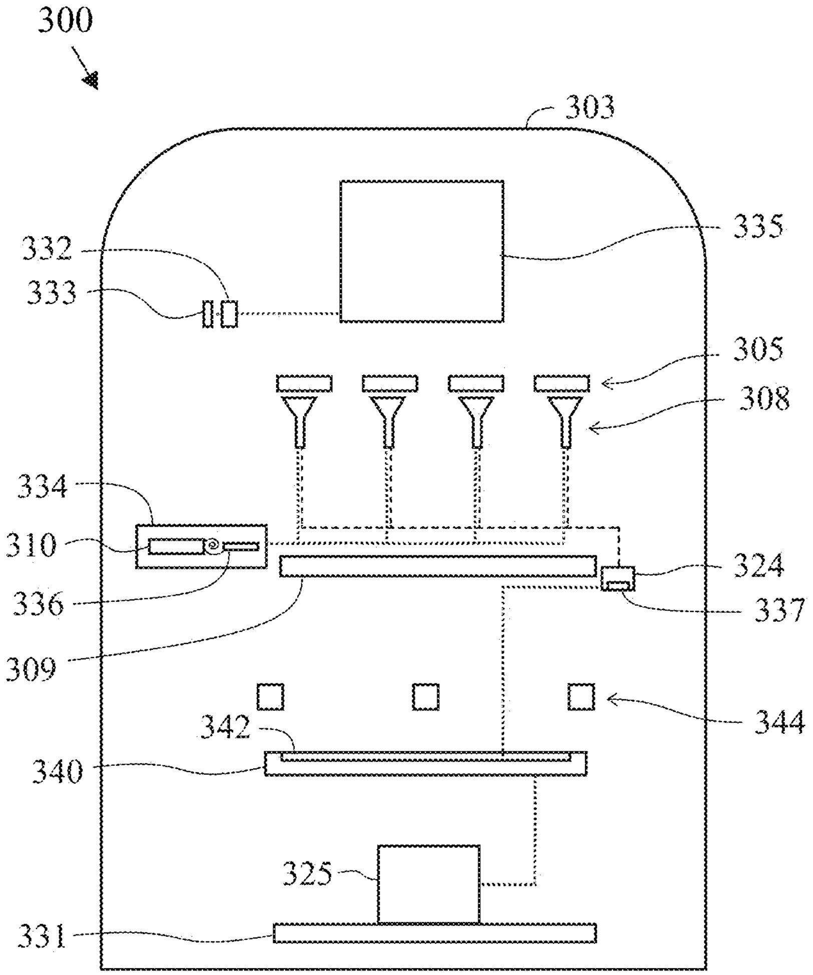
FIG. 5 is a block diagram of an apparatus for automated medication dispensing.

FIG. 5 is a block diagram of a preferred embodiment of an apparatus for automated medication dispensing. The apparatus 300 is comprised of: a body 303; a user interface screen (UI) 335 on the body 303; a processor 332 within the body and in communication with the UI 335; a memory 333 within the body and in communication with the processor, the memory comprising a pre-programmed database; a motor driven rotating carousel plate 309 positioned within the body and configured to hold medication bottles; universal caps 305, each of the of medication bottles having a universal cap 30; funnels 308, each of the universal caps connected to a funnel 308; a vacuum extraction mechanism 334 comprising a vacuum pump 310 and a retractable nozzle 336, the vacuum extraction mechanism 334 in flow communication with each of the funnels 308; a magnetic resonance agitator 324 comprising a magnetic field generator 337, the magnetic resonance agitator 324 in flow communication with each of the funnels 308; a verification station 340 comprising a counter 342 and high resolution cameras 344, the verification station 340 in flow communication with the magnetic resonance agitator 324; a scale-equipped platform 341; and a dispensing cup 325 positioned on the platform 341, the cup in flow communication with the verification station 340.

Figure 6:
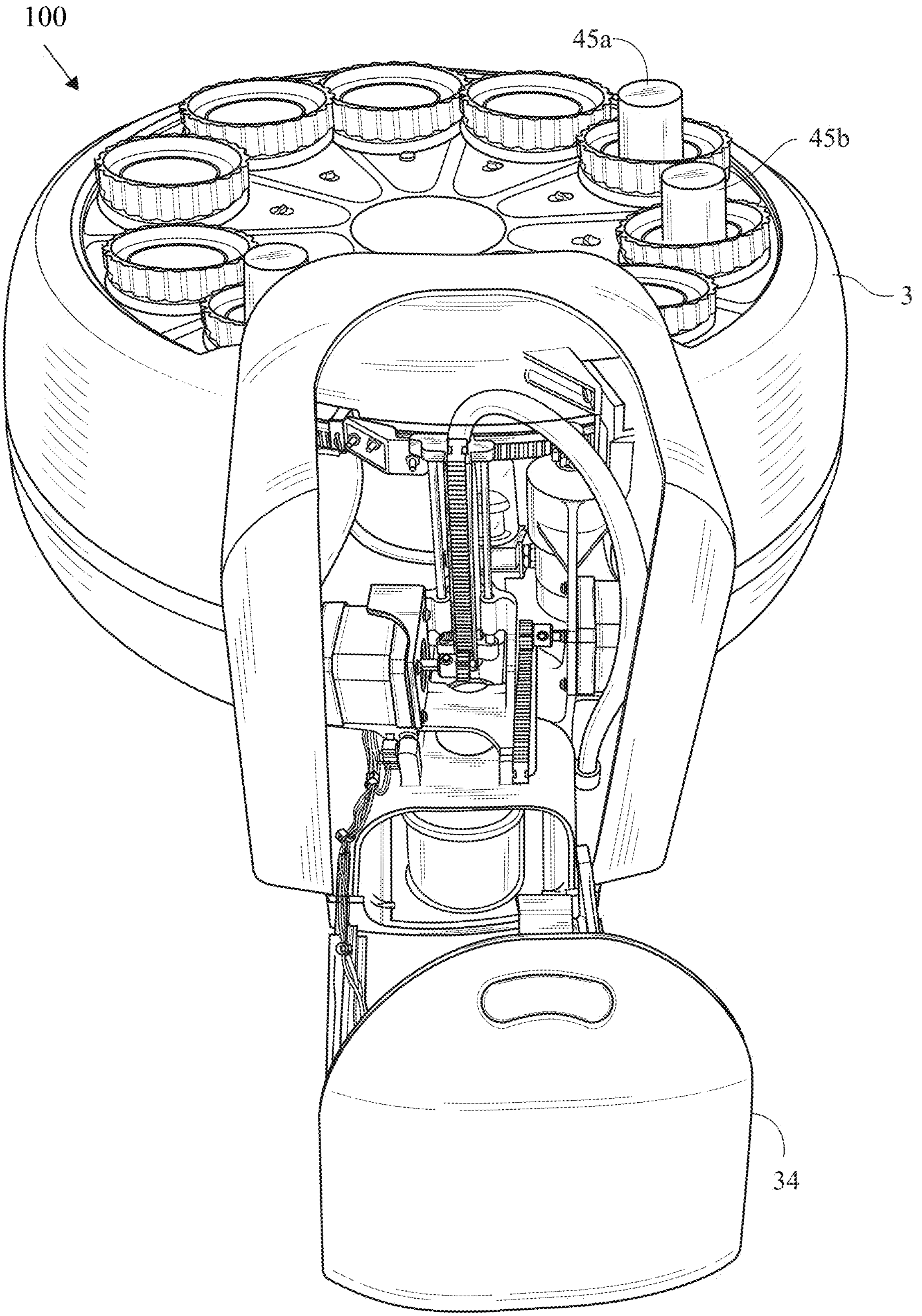
FIG. 6 is an illustration of the dispensing apparatus.
Figure 7:
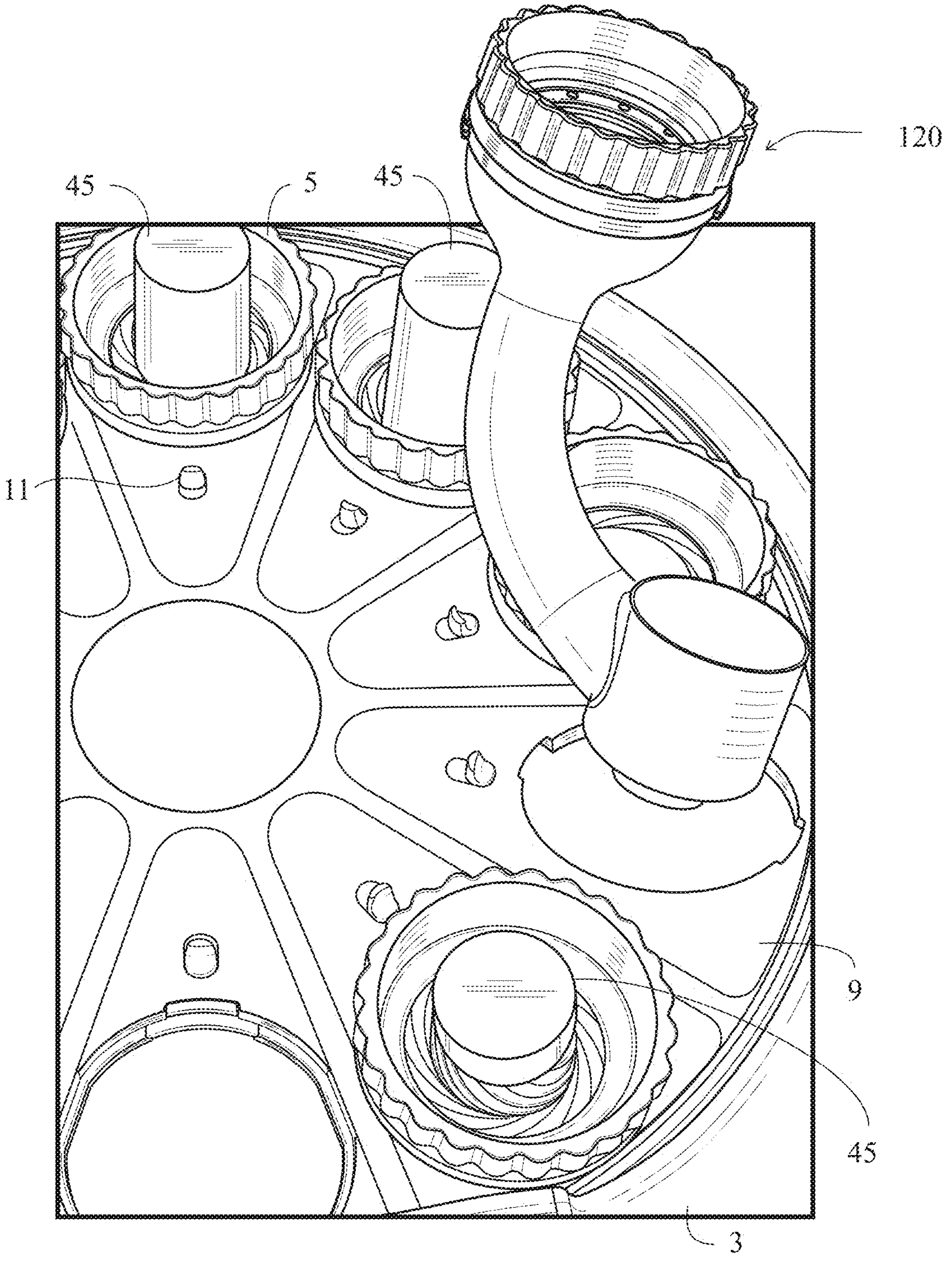
FIG. 7 is an illustration of the dispensing apparatus and the universal cap.

FIG. 6 is an illustration of an apparatus 100 with the door 34 of the body 3 open. FIGS. 7-10 show the top and the interior of the apparatus 100.

The automated medication dispensing apparatus 100 is a sophisticated mechanical and electronic device designed to enhance the accuracy and efficiency of medication management. Central to the system is a motor-driven 18 rotating carousel plate 9, which holds multiple bottles 45 of different pills, indexed and controlled for precise selection. Pills are extracted from their respective bottles 45 by a vacuum extraction mechanism 10, shown in FIG. 8. This mechanism 10 activates to create a negative pressure, gently drawing pills out via the universal cap 120 without damage, regardless of their size or shape. Once the pills are extracted, they travel through a specially designed funnel 8, similar to those found in vending machines but coated with an anti-static material to ensure pills flow smoothly without sticking. The funnel 8 guides the pills into the critical component of the system, the magnetic resonance agitator 24. This agitator employs a sophisticated magnetic field generator that produces finely tuned vibrations. These vibrations are crucial for preventing the aggregation of pills by inducing a resonant frequency that matches the natural frequency of the pill materials, ensuring they remain separate without causing any damage to their structural integrity. As pills pass through the agitator, they enter a verification station 340 equipped with advanced sensors and high-resolution cameras 44, as shown in FIG. 9. This setup 340 verifies the accuracy of each pill dispensed by comparing its characteristics-such as size, shape, and color-against a pre-programmed database, and simultaneously counts them to ensure the correct dosage. Pills that pass this verification are then directed into a dispensing cup 25, placed on a scale-equipped platform 41 that adjusts for different cup sizes and provides additional verification through weight. The entire system is controlled via a sophisticated electronic control system that integrates with electronic medical records, ensuring each patient receives the correct dosage as prescribed. The control interface also includes a touchscreen 16, allowing caregivers to make adjustments or manual inputs as necessary.

Figure 8:
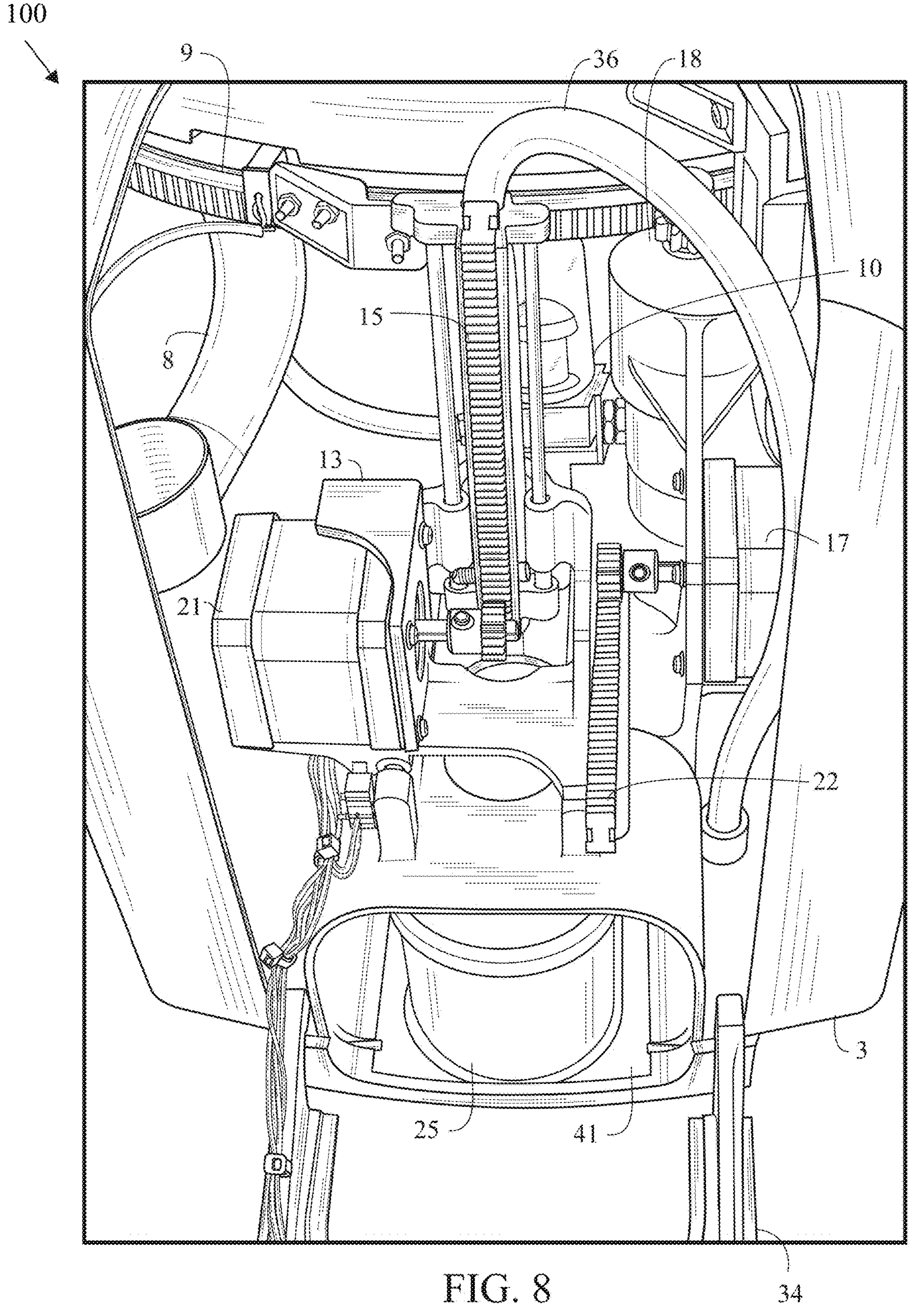
FIG. 8 is an illustration of the interior of the apparatus.
Figure 9:
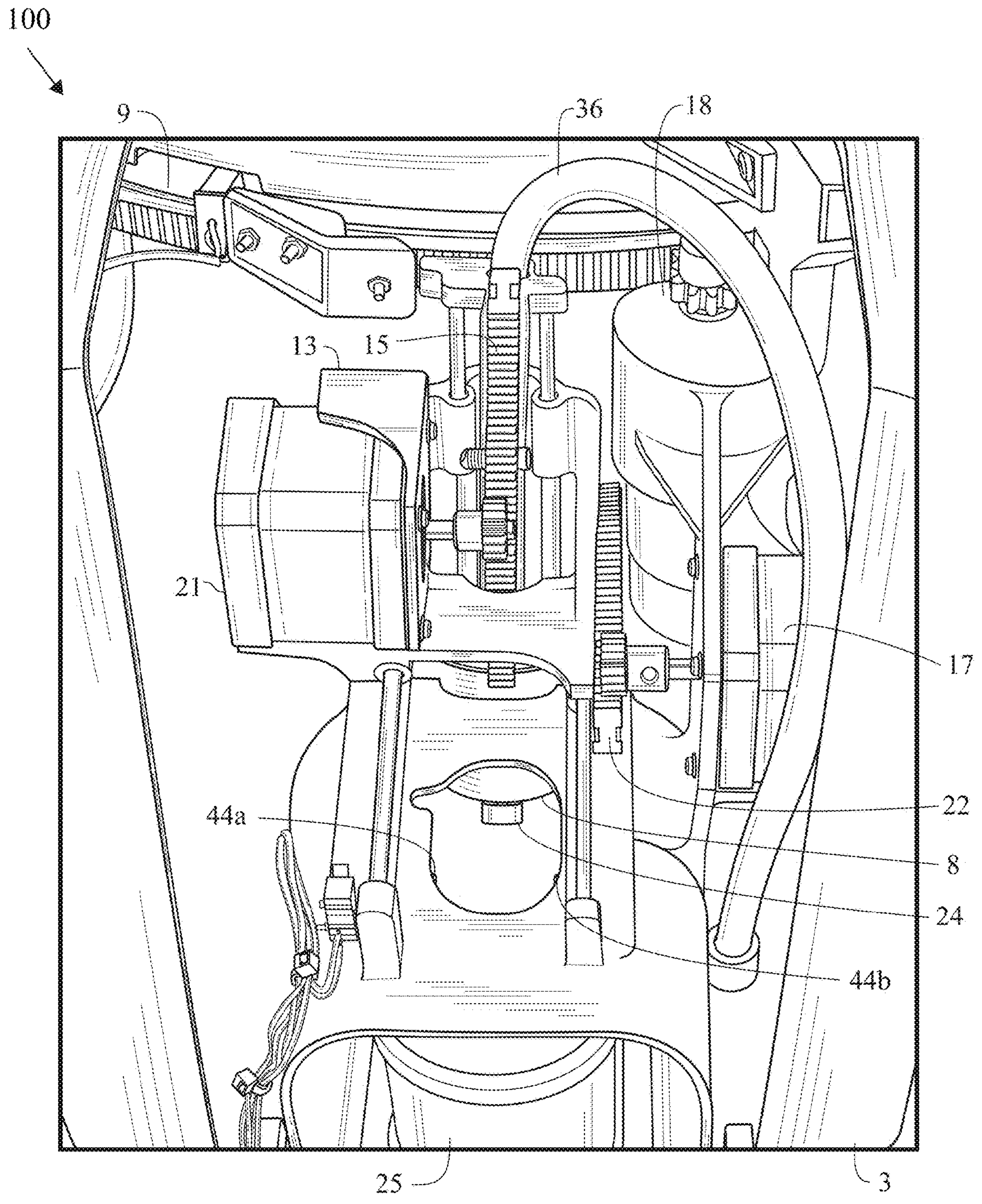
FIG. 9 is an illustration of the interior of the apparatus.
Figure 10:
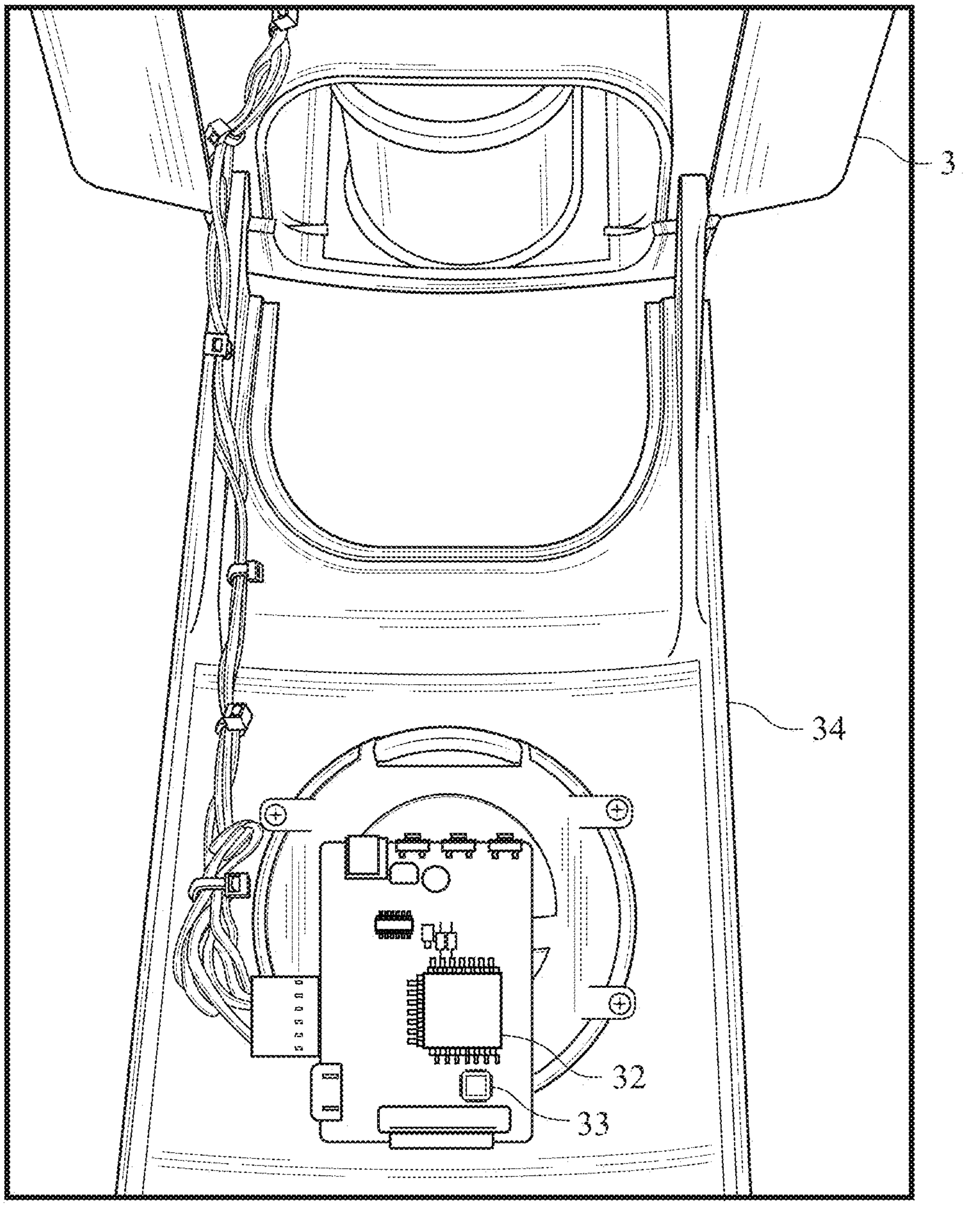
FIG. 10 is an illustration of the interior of the apparatus.

FIG. 8 shows the mechanism drawn back, towards the door 34. FIG. 9 shows the mechanism drawn forward by the horizontal rail 22 and the nozzle 36 drawn down by the vertical rail 15.

Safety is paramount, with features like automatic lockouts for discrepancies in pill type or count, and emergency stop functions readily accessible. Regular maintenance notifications are programmed to maintain optimal operation efficiency. The automated medication dispensing system minimizes human error and enhances patient compliance with medication therapies, providing a reliable and efficient solution in healthcare settings.

The present invention has the following benefits. Cross-Platform, Real-Time Interaction Interface: Software developed using reactive programming frameworks that ensure seamless, real-time user interaction across various devices, secured by OAuth for authentication and HTTPS protocols for data transmission. Customizable Real-Time Data Visualization: A system employing business intelligence tools to generate dynamic, real-time visualizations of healthcare metrics from a centralized data dashboard, enabling stakeholders to gain actionable insights into operational performance and patient care outcomes. Predictive Analytics for Compliance and Health Management: An innovative use of predictive analytics to foresee potential compliance issues and patient health outcomes, based on evolving regulations and treatment data, facilitating proactive adjustments and personalized care plans. Intelligent Medication Management with Real-Time Feedback System: Incorporates a smart medication management system that leverages machine learning to predict medication usage patterns and optimize stock levels, with sentiment analysis to process caregiver and patient feedback, thus continually improving service quality.

Advanced Automated Dispensing Technology: The machine employs a sophisticated dispensing mechanism capable of accurately handling up to 20 types of pills for 15 patients, leveraging barcode scanning and RFID technology for precise pill identification and tracking. Its modular design allows for easy scalability and maintenance, with individual pill cartridges that can be preloaded and quickly swapped to accommodate different medication regimens.

Comprehensive Management Software: A cloud-based management platform integrates patient profiles, medication orders, and healthcare provider instructions into a unified system. Utilizing advanced encryption and data protection protocols, it ensures secure access and compliance with healthcare regulations such as HIPAA. The software supports dynamic form creation for patient onboarding, caregiver registration, and medication order processing, enabling real-time updates and adjustments.

Advanced Patient Data Analytics Platform: Utilizes deep learning algorithms to interpret complex medical data, extracting actionable insights and integrating these with electronic health records to automate and improve care processes.

Dynamic Inventory Management System: An JoT-enabled automated medication holder that utilizes real-time sensing technology to monitor and manage inventory levels of medications, automatically alerting the system when stocks are low or medications are nearing expiry, and adjusting orders accordingly.

Intelligent Task Scheduling and Optimization: Utilizing AI algorithms, the system dynamically assigns and schedules caregiver tasks, taking into account patient needs, caregiver availability, and priority levels. The algorithm can adapt to manual inputs from supervisors or automate task distribution based on predefined criteria, enhancing operational efficiency and patient care quality, Enhanced Real-Time Monitoring and Interaction: Incorporating loT technology, the machine facilitates real-time data collection and transmission, allowing caregivers to input feedback directly through portable devices. This includes the ability to document medication side effects, patient conditions, and upload multimedia evidence for comprehensive care records. Machine learning algorithms analyze this data to suggest adjustments to care plans and predict potential health issues.

Data-Driven Insights and Reporting: Leveraging big data analytics, the system compiles and analyzes extensive datasets on medication adherence, patient health trends, and caregiver efficiency. Customizable reporting tools provide valuable insights for continuous improvement in care protocols and operational workflows.

Predictive Health Management: AI and machine learning technologies are employed to analyze historical and real-time data, identifying patterns and predicting health outcomes. This facilitates proactive adjustments to treatment plans, personalized patient care, and early intervention strategies, significantly improving long-term health results.

Telehealth Integration: The machine seamlessly integrates with telehealth platforms, enabling virtual consultations and health assessments. This allows for timely medical advice, adjustment of medication regimens, and direct integration of virtual visit outcomes into the patient's care plan, enhancing accessibility and continuity of care.

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOs and variants thereof (available from Apple, Inc. of Cupertino, Calif.), or the like.

The method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Components of a server includes a CPU component, a graphics component, PCI/PCI Express, memory, non-removable storage, removable storage, Network Interface, including one or more connections to a fixed network, and SQL database(s), which includes the venue's CRM. Included in the memory, is an operating system, a SQL server or other database engine, and computer programs/software. The server also includes at least one computer program configured to receive data uploads and store the data uploads in the SQL database. Alternatively, the SQL server can be installed in a separate server from the venue server.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. An apparatus for automated medication dispensing, the apparatus comprising:
- a body;
- a user interface screen on the body;
- a processor within the body and in communication with the user interface screen;
- a memory within the body and in communication with the processor, the memory comprising a pre-programmed database;
- a motor driven rotating carousel plate positioned within the body and configured to hold a plurality of medication bottles;
- a plurality of universal caps, each of the plurality of medication bottles having a universal cap of the plurality of universal caps;
- a plurality of funnels, each of the plurality of universal caps connected to a funnel of the plurality of funnels;
- a vacuum extraction mechanism comprising a vacuum pump and a retractable nozzle, the vacuum extraction mechanism in flow communication with each of the plurality of funnels;
- a magnetic resonance agitator comprising a magnetic field generator, the magnetic resonance agitator in flow communication with each of the plurality of funnels;
- a verification station comprising a counter and plurality of high resolution cameras, the verification station in flow communication with the magnetic resonance agitator;
- a scale-equipped platform; and
- a dispensing cup positioned on the scale-equipped platform, the dispensing cup in flow communication with the verification station;
- wherein the vacuum extraction mechanism generates a negative pressure to draw selected pills from a medication bottle of the plurality of medication bottles via a universal cap and through a connected funnel of the plurality of funnels to the magnetic resonance agitator;
- wherein the magnetic resonance agitator is configured to generate a pre-determined vibration to induce a resonant frequency that matches the natural frequency of the material of the selected pills to ensure separation of the selected pills;
- wherein the verification station is configured to verify the accuracy of each pill dispensed by comparing at least one characteristic of the selected pills against a data for the selected pills in the pre-programmed database, and wherein the verification station is configured to count the selected pills;
- wherein the scale-equipped platform is configured to verify the weight of the dispensing cup containing the selected pills.

2. The apparatus according to claim 1 wherein each of the plurality of universal caps comprises an adjuster, a plurality of opening/closing vanes, and a fixer cap, wherein the each of plurality of universal caps is configured to expand or contract an opening to fit an opening of the medication bottle.

3. The apparatus according to claim 1 further comprising a motor to drive the motor driven rotating carousel plate.

4. The apparatus according to claim 1 wherein the apparatus is configured for 10 to 20 different medications.

5. The apparatus according to claim 1 further comprising a plurality of internet of things (IoT) enabled automated medication holders within the body, each of the plurality of IoT enabled automated medication holders comprising an optical sensor for medication inventory management.

6. A system for automated medication dispensing, the system comprising:
- a management platform residing on a server;
- an apparatus in communication with the management platform, the apparatus comprising
  - a body,
  - a user interface screen on the body,
  - a processor within the body and in communication with the user interface screen,
  - a memory within the body and in communication with the processor, the memory comprising a pre-programmed database,
  - a motor driven rotating carousel plate positioned within the body and configured to hold a plurality of medication bottles,
  - a plurality of universal caps, each of the plurality of medication bottles having a universal cap of the plurality of universal caps,
  - a plurality of funnels, each of the plurality of universal caps connected to a funnel of the plurality of funnels,
  - a vacuum extraction mechanism comprising a vacuum pump and a retractable nozzle, the vacuum extraction mechanism in flow communication with each of the plurality of funnels,
  - a magnetic resonance agitator comprising a magnetic field generator, the magnetic resonance agitator in flow communication with each of the plurality of funnels,
  - a verification station comprising a counter and plurality of high resolution cameras, the verification station in flow communication with the magnetic resonance agitator,
  - a scale-equipped platform, and
  - a dispensing cup positioned on the scale-equipped platform, the dispensing cup in flow communication with the verification station,
  - wherein the vacuum extraction mechanism generates a negative pressure to draw selected pills from a medication bottle of the plurality of medication bottles via a universal cap and through a connected funnel of the plurality of funnels to the magnetic resonance agitator,
  - wherein the magnetic resonance agitator is configured to generate a pre-determined vibration to induce a resonant frequency that matches the natural frequency of the material of the selected pills to ensure separation of the selected pills,
  - wherein the verification station is configured to verify the accuracy of each pill dispensed by comparing at least one characteristic of the selected pills against a data for the selected pills in the pre-programmed database, and wherein the verification station is configured to count the selected pills,
  - wherein the scale-equipped platform is configured to verify the weight of the dispensing cup containing the selected pills;
  - wherein the management platform is configured to predict medication usage patterns and optimize stock levels.

7. The system according to claim 6 wherein management platform is configured to prioritize and allocate tasks based on at least one of caregiver availability, patient needs, and urgency, improving operational efficiency or patient care quality.

8. The system according to claim 6 wherein management platform is configured to Implement sentiment analysis to evaluate caregiver and patient feedback, automatically identifying areas for improvement and facilitating responsive care adjustments.

9. The system according to claim 6 further comprising a plurality of telehealth modules configured to support remote patient monitoring, integrating AI to analyze patient interactions and provide personalized care recommendations.

10. The system according to claim 6 wherein each of the plurality of universal caps comprises an adjuster, a plurality of opening/closing vanes, and a fixer cap, wherein the each of plurality of universal caps is configured to expand or contract an opening to fit an opening of the medication bottle.

11. The system according to claim 6 wherein the apparatus further comprises a motor to drive the motor driven rotating carousel plate.

12. The system according to claim 6 wherein the apparatus is configured for 10 to 20 different medications.

13. The system according to claim 6 wherein the apparatus further comprises a plurality of internet of things (IoT) enabled automated medication holders within the body, each of the plurality of IoT enabled automated medication holders comprising an optical sensor for medication inventory management.

* * * * *